United States Patent
Inoue

(10) Patent No.: US 10,233,994 B2
(45) Date of Patent: Mar. 19, 2019

(54) DAMPER DEVICE

(71) Applicant: PIOLAX, INC., Yokohama-shi (JP)

(72) Inventor: Masatoshi Inoue, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 15/566,703

(22) PCT Filed: Apr. 15, 2016

(86) PCT No.: PCT/JP2016/062074
§ 371 (c)(1),
(2) Date: Oct. 14, 2017

(87) PCT Pub. No.: WO2016/167336
PCT Pub. Date: Oct. 20, 2016

(65) Prior Publication Data
US 2018/0135719 A1 May 17, 2018

(30) Foreign Application Priority Data
Apr. 16, 2015 (JP) .................................. 2015-084233

(51) Int. Cl.
*F16F 9/32* (2006.01)
*F16F 9/516* (2006.01)
(Continued)

(52) U.S. Cl.
CPC .......... *F16F 9/3221* (2013.01); *F16F 9/0227* (2013.01); *F16F 9/362* (2013.01); *F16F 9/368* (2013.01); *F16F 9/516* (2013.01)

(58) Field of Classification Search
CPC ........ F16F 9/3221; F16F 9/0227; F16F 9/362; F16F 9/368; F16F 9/516
See application file for complete search history.

(56) References Cited

U.S. PATENT DOCUMENTS 4,673,000 A * 6/1987 Haerr ..................... F16K 15/142
137/860
5,035,440 A * 7/1991 Chappell ................. B62J 11/02
280/201
(Continued)

FOREIGN PATENT DOCUMENTS

GB 2 102 876 A 2/1983
JP S 58-12740 U 1/1983
(Continued)

OTHER PUBLICATIONS

International Search Report (ISR) (PCT Form PCT/ISA/210), in PCT/JP2016/062074, dated Jun. 7, 2016 (English version).
(Continued)

*Primary Examiner* — Vishal R Sahni
(74) *Attorney, Agent, or Firm* — McGinn IP Law Group, PLLC.

(57) ABSTRACT

A damper device includes a cylinder, a piston, a seal ring member, and a transmitting portion. The piston includes an annular outer circumferential portion, a first stopper portion, a second stopper portion, and a projecting portion. The projecting portion has an inclined surface which is inclined radially outwards form a side of the second stopper portion towards a side of the first stopper portion. The seal ring member is configured to allow a first chamber to communicate with a second chamber when a portion of the seal ring member which is not restricted by the first stopper portion is deformed in a direction away from the second stopper portion due to friction caused between the seal ring member and the cylinder or a fluid pressure from the second chamber to ride on the inclined surface.

4 Claims, 8 Drawing Sheets

(51) Int. Cl.
  *F16F 9/36*  (2006.01)
  *F16F 9/02*  (2006.01)

(56) References Cited

U.S. PATENT DOCUMENTS

| | | | | |
|---|---|---|---|---|
| 5,127,804 | A * | 7/1992 | Chappell | B62J 11/02 |
| | | | | 280/201 |
| 6,206,421 | B1 | 3/2001 | Schremmer | |
| 7,540,304 | B2 * | 6/2009 | Cornwell | F16K 15/021 |
| | | | | 137/860 |
| 2010/0253101 | A1 * | 10/2010 | Seto | E05B 85/12 |
| | | | | 292/336.3 |
| 2011/0127129 | A1 * | 6/2011 | Okabayashi | F16F 9/3415 |
| | | | | 188/282.1 |
| 2017/0009837 | A1 * | 1/2017 | Saito | F16J 1/008 |

FOREIGN PATENT DOCUMENTS

| | | |
|---|---|---|
| JP | H 05-500400 A | 1/1993 |
| JP | H 05-67840 U | 9/1993 |
| JP | 2007-06245 A | 3/2007 |
| JP | 2010-001920 A | 1/2010 |
| WO | WO 2007/111016 A1 | 10/2007 |
| WO | WO 2015/114885 A1 | 8/2015 |

OTHER PUBLICATIONS (PCT Form PCT/ISA/237), in PCT/JP2016/062074, dated Jun. 7, 2016.

* cited by examiner

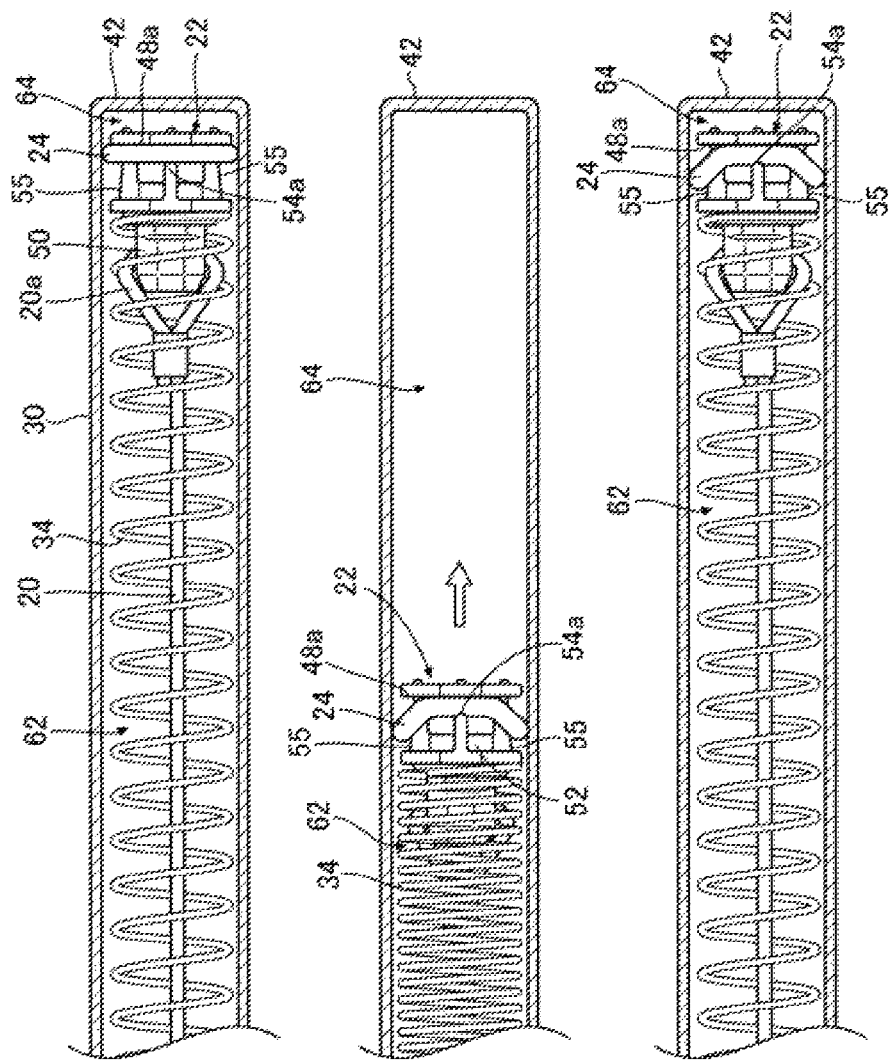

DAMPER DEVICE

TECHNICAL FIELD

The present invention relates to a damper device in which a seal ring member is provided on an outer circumference of a piston which is disposed within a cylinder.

BACKGROUND ART

A damper device is provided so that a lid member of a glove box of a vehicle is opened slowly. This damper device functions to enable the lid member to be opened gently due to a damping force, while the damper device functions to enable the lid member to be closed easily with little resistance when the lid member is closed.

For example, Patent Document 1 discloses a damper device which includes a cylinder, a piston which can move in an axial direction within the cylinder, and a seal ring which is positioned on an outer circumference of the piston to seal up a space defined between the cylinder and the piston.

The piston disclosed in Patent Document 1 has a pair of flanges which are provided on the outer circumference thereof so as face each other in the axial direction, cut-out portions which are formed individually on the flanges and a groove which is formed on an outer circumferential surface of the piston where the cut-out portions are formed. The seal ring disclosed in Patent Document 1 is disposed between the pair of flanges of the piston, so that the seal ring can enter the cut-out portions by being deformed partially. When the piston is actuated to operate, the seal ring is caused to enter the cut-out portions due to an air pressure to allow an interior space of the piston to communicate with an exterior space of the piston.

PRIOR ART DOCUMENT

Patent Document

Patent Document 1: JP-A-2010-1920

SUMMARY OF INVENTION

Problems to be Solved by Invention

In the technique disclosed in Patent Document 1, the seal ring is designed to restore its original shape by a restoring force when the seal ring is deformed partially. However, in case the seal ring deflects greatly, there are fears that the seal ring does not restore its original shape only due to the restoring force. In case the seal ring does not restore its shape, the interior space and the exterior space of the piston are kept communicating with each other, resulting in a possibility that the initial damping force of the damper device resulting when it starts operating is reduced.

The invention has been made in view of the problems, and an object thereof is to provide a damper device which can prevent a reduction in damping force thereof.

Means for Solving Problems

In order to solve the above problems, according to an aspect of the invention, there is provided a damper device including a cylinder having a bottom portion and an opening portion, a piston being erciprocatable within the cylinder, a seal ring member provided on an outer circumference of the piston to divide an interior of the cylinder into a first chamber and a second chamber and brought into abutment with an inner circumference of the cylinder, and a transmitting portion connected to the piston so as to transmit an external force to the piston. The piston includes an annular outer circumferential portion which is brought into abutment with an inner circumference of the seal ring member, a first stopper portion which is provided so as to project in a radial direction from the annular outer circumferential portion at a side of the first chamber to restrict an axial movement of a part of the seal ring member, a second stopper portion which is provided so as to project in the radial direction from the annular outer circumferential portion at a side of the second chamber to restrict an axial movement of the seal ring member, and a projecting portion which is formed so as to extend in an axial direction while projecting in the radial direction beyond the annular outer circumferential portion and which is disposed so as to be spaced apart from the first stopper portion in a circumferential direction. The projecting portion has an inclined surface which is inclined radially outwards from a side of the second stopper portion towards a side of the first stopper portion. The seal ring member is configured to allow the first chamber to communicate with the second chamber when a portion of the seal ring member which is not restricted by the first stopper portion is deformed in a direction away from the second stopper portion due to friction caused between the seal ring member and the cylinder or a fluid pressure from the second chamber to ride on the inclined surface.

Advantageous Effects of Invention

According to the invention, it is possible to provide the damper device which can prevent a reduction in damping force thereof.

BRIEF DESCRIPTION OF DRAWINGS

FIG. 6(a) to 6(c) shows views of the damper device for explaining an operation thereof.

FIG. 1(a) is a perspective view of a damper device 10, and FIG. 1(b) is a perspective view of the damper device 10 with a cylinder 30 cut away. FIG. 2 is an exploded perspective view of the damper device 10 showing constituent elements to be assembled thereinto. The damper device 10 is attached, for example, to a glove box of a vehicle to impart a damping force to an openable/closable member (a lid member) of the glove box when the openable/closable member is opened and closed.

Figures 1A, 1B:
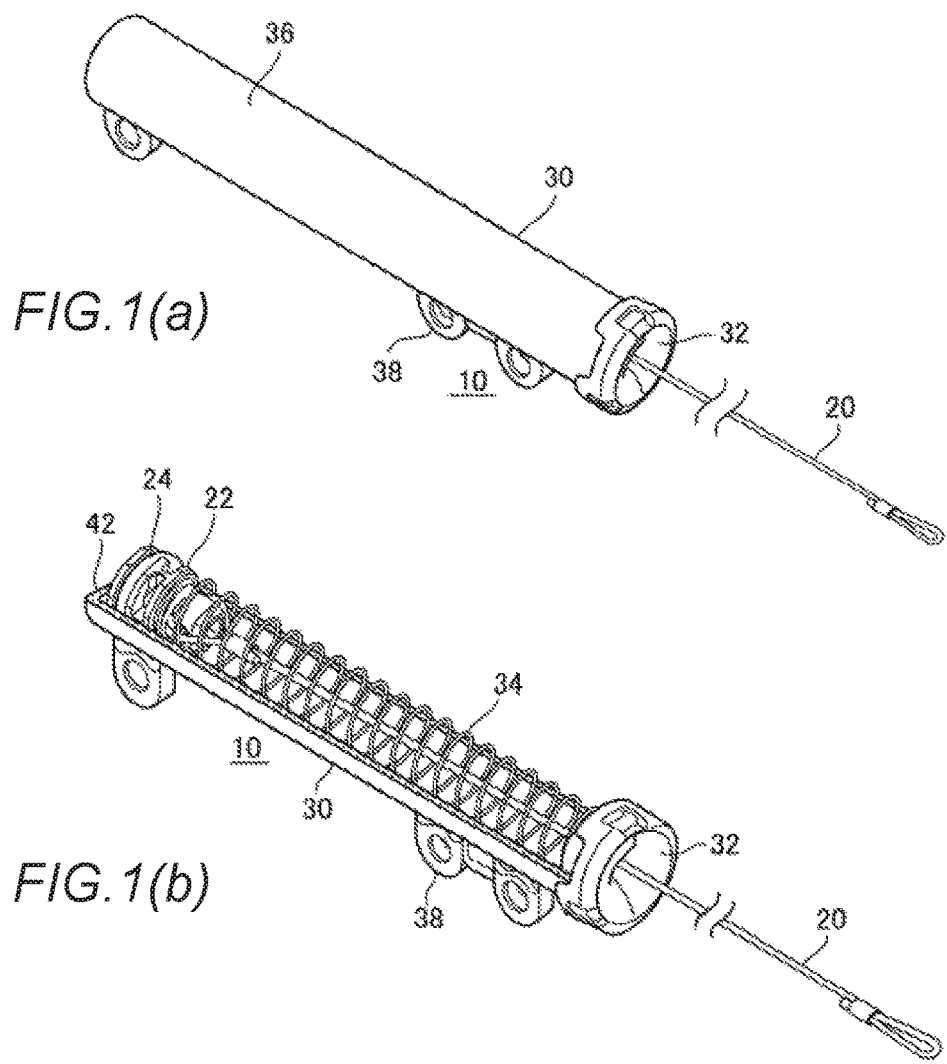
FIG. 1(a) is a perspective view of a damper device.
FIG. 1(b) is a perspective view of the damper device with a cylinder cut away.
Figure 2:
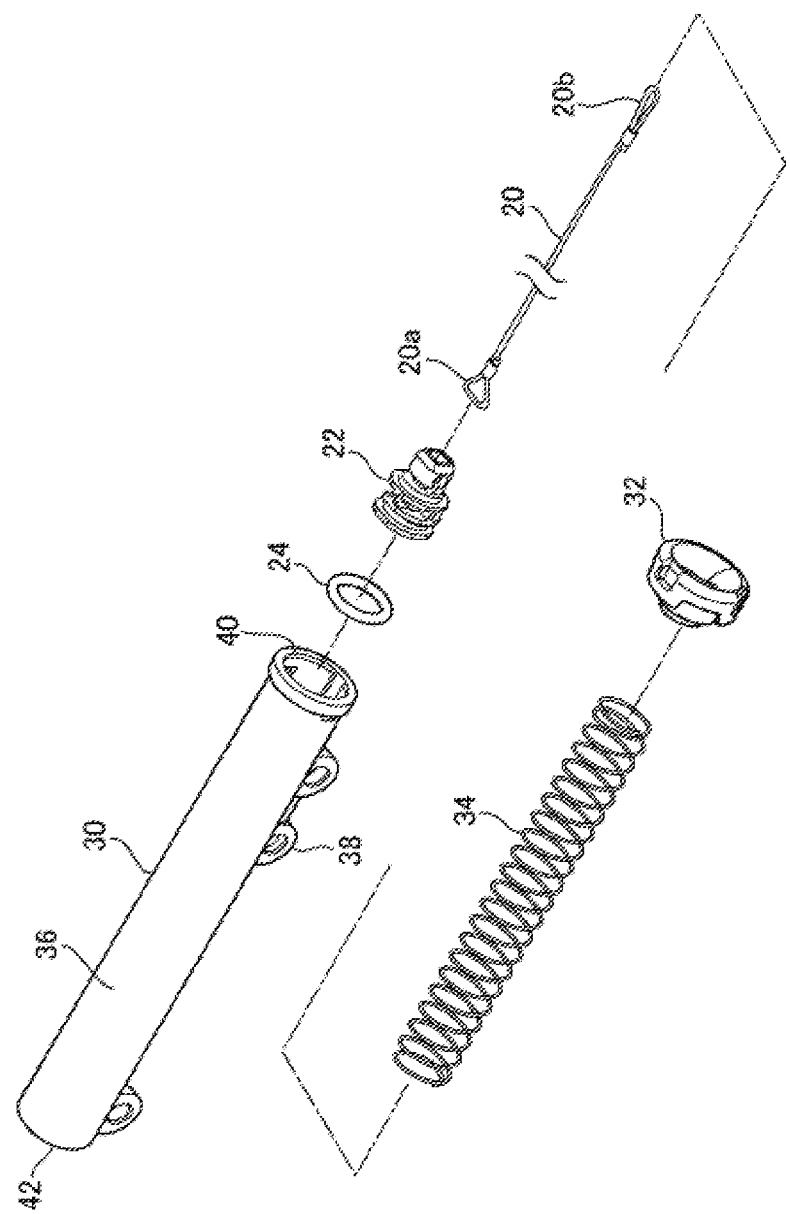
FIG. 2 is an exploded perspective view of the damper device showing constituent elements to be assembled thereinto.

The damper device 10 has the cylinder 30, a seal ring member 24, a piston 22, a transmitting member 20, a biasing member 34 and a lid member 32. The cylinder 30 is formed into a bottomed cylindrical shape. The cylinder 30 has a tubular portion 36, attaching portions 38, an opening portion 40 and a bottom portion 42. The bottom portion 42 is formed at one end of the tubular portion 36, and the opening portion 40 is formed at the other end of the tubular portion 36. The attaching portions 38 are formed on an outer circumferential surface of the tubular portion 36 to fix the damper device 10 to a glove box main body.

The seal ring member 24 is an O ring having a circular section and is formed of a rubber material to thereby have elasticity. The seal ring member 24 is provided on an outer circumference of the piston 22. The piston 22 divides an interior of the cylinder 30 into a first chamber and a second chamber and can reciprocate within the cylinder 30. It should be noted that in the cylinder 30, a space defined between the seal ring member 24 and the opening portion 40 is referred to as the first chamber, and a space defined between the seal ring member 24 and the bottom portion 42 is referred to as the second chamber. The seal ring member 24 is brought into abutment with an inner circumferential surface of the cylinder 30 at a radially outer portion thereof so as to seal up the first chamber and the second chamber.

The transmitting member 20 transmits an external force to the piston 22. A first connecting portion 20a which is provided at one end of the transmitting member 20 is connected to the piston 22, while a second connecting portion 20b which is provided at the other end of the transmitting member 20 is connected to the openable/closable member of the glove box.

The biasing member 34 is a coil spring and is brought into abutment with the piston 22 at one end and with the lid member 32 at the other end thereof. The biasing member 34 biases the piston 22 towards the bottom portion 42 of the cylinder 30. The lid member 32 is locked on the cylinder 30 so as to close the opening portion 40. The lid member 32 has a hole portion through which the transmitting member 20 is inserted in a center thereof.

In this damper device 10, the cylinder 30 is fixed to the glove box main body, and the transmitting member 20 is connected to the openable/closable member of the glove box. The piston 22 reciprocates within the cylinder 30 as the openable/closable member is opened and closed. A negative pressure is generated in the second chamber at a side of the bottom portion 42 in the cylinder 30 when the piston 22 advances towards the opening portion 40, whereby a damping force is generated. Namely, the transmitting member 20, the piston 22 and the seal ring member 24 are pulled towards the opening portion 40 when the openable/closable member is opened, and an opening speed of the openable/closable member can be mitigated due to the negative pressure generated in the second chamber. The piston 22 of this damper device 10 will be described in greater detail.

Figure 3A:
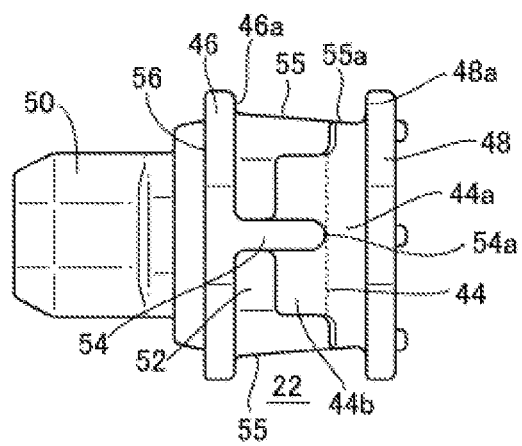
FIG. 3(a) is a front view of a piston.
Figure 3B:
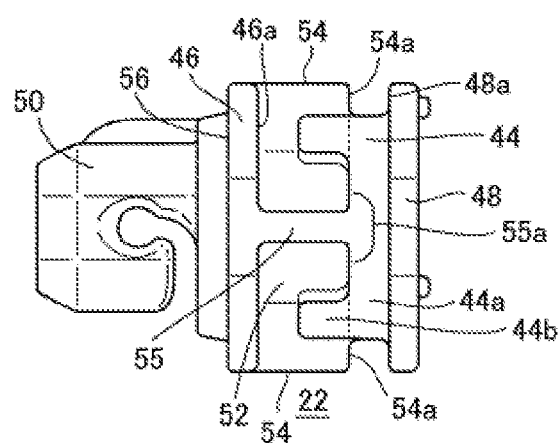
FIG. 3(b) is a side view of the piston.
Figure 3C:
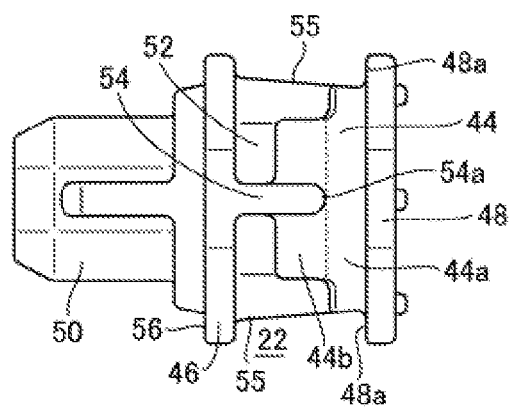
FIG. 3(c) is a rear view of the piston.
Figure 4A:
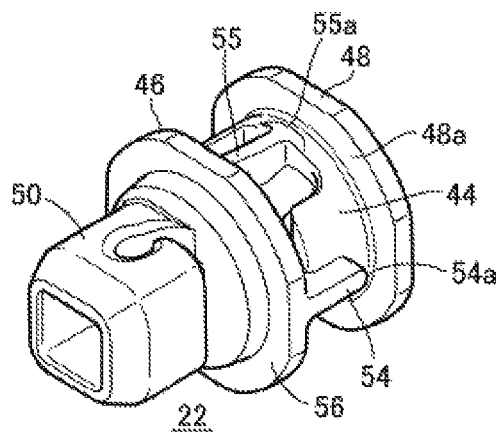
FIG. 4(a) is a perspective view of the piston when seen from a front side.
Figure 4B:
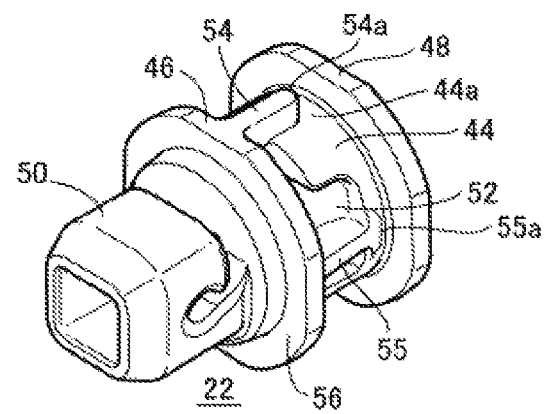
FIG. 4(b) is a perspective view of the piston resulting when the piston shown in FIG. 4(a) is rotated 90 degrees about a moving direction thereof as an axis of rotation.
Figure 4C:
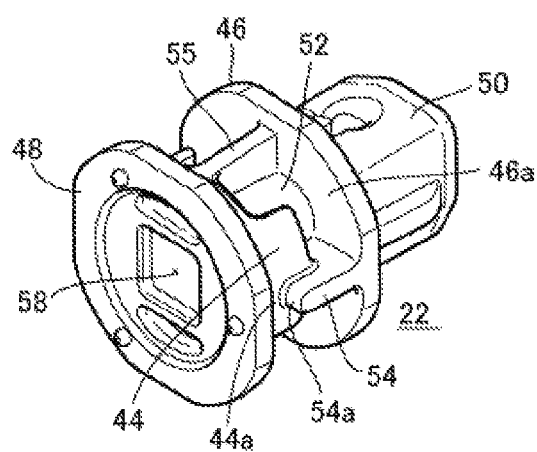
FIG. 4(c) is a perspective view of the piston when seen from a rear side thereof.

FIG. 3(a) is a front view of the piston 22, FIG. 3(b) is a side view of the piston 22, and FIG. 3(c) is a rear view of the piston 22. FIG. 4(a) is a perspective view of the piston 22 when seen from a front side thereof, FIG. 4(b) is a perspective view of the piston 22 resulting when the piston 22 shown in FIG. 4(a) is rotated 90 degrees about a moving direction thereof as an axis of rotation, and FIG. 4(c) is a perspective view of the piston 22 when seen from a rear side thereof.

The piston 22 has a small diameter portion 44, a first large diameter portion 46, a second large diameter portion 48, a connecting portion 50, groove portions 52, protruding portions 54, projecting portions 55, a pedestal portion 56 and an orifice 58. The connecting portion 50 is provided at a tip end side of the piston 22 and is formed into the shape of a hook so that the first connecting portion 20a of the transmitting member 20 can be connected thereto. The connecting portion 50 is provided so as to project from the pedestal portion 56. The pedestal portion 56 functions as a seat surface with which one end of the biasing member 34 is brought into abutment.

As shown in FIG. 3(a), the small diameter portion 44, the groove portions 52, the protruding portions 54 and the projecting portions 55 are formed between the first large diameter portion 46 at the tip end side of the piston 22 and the second large diameter portion 48 at a rear end side of the piston 22. The first large diameter portion 46 and the second large diameter portion 48 are larger in diameter than the small diameter portion 44, and the small diameter portion 44 is formed between the first large diameter portion 46 and the second large diameter portion 48 so as to be recessed annularly relative to the first and second larger diameter portions 46, 48.

The seal ring member 24 is mounted on the small diameter portion 44 in such a way as to be restricted from moving in an axial direction by the first large diameter portion 46 and the second large diameter portion 48. An annular outer circumferential portion 44a is formed as an outer circumferential surface of the small diameter portion 44, and the annular outer circumferential portion 44a is brought into abutment with an inner circumference of the seal ring member 24 when the seal ring member 24 is mounted on the small diameter portion 44.

As shown in FIGS. 3(b) and 4(b), the protruding portions 54 are each formed into a projection which extends from the first large diameter portion 46 towards the second large diameter portion 48 along an axial direction while protruding radially outwards beyond the small diameter portion 44. End portions of the protruding portions 54 function as first stopper portions 54a which restrict a part of the seal ring member 24 from moving in the axial direction. As shown in FIG. 3(b), a pair of first stopper portions 54a are provided so as to project radially from the annular outer circumferential portion 44a at a side of the first chamber. A circumferential width of the protruding portion 54 is set at almost the same width as that of the projecting portion 55 and is set at a circumferential angular width ranging from 1 to 10 degrees.

As shown in FIG. 4(a), a surface of the second large diameter portion 48 at a side of the small diameter portion 44, that is, a front surface of the second large diameter portion 48 functions as a second stopper portion 48a which restricts the whole of the seal ring member 24 from moving in the axial direction. The second stopper portion 48a is provided at the other axial end of the annular outer circumferential portion 44a so as to project radially. The second stopper portion 48a is provided so as to project radially from the annular outer circumferential portion 44a at a side of the second chamber.

As shown in FIG. 4(c), a surface of the first large diameter portion 46 at a side of the small diameter portion 44, that is, a rear surface of the first large diameter portion 46 functions as a third stopper portion 46a which restricts the seal ring member 24 from moving excessively in the axial direction. The third stopper portion 46a is provided at an axial end of the annular outer circumferential portion 44a so as to project radially to be at right angles to the axial direction. The third stopper portion 46a can prevent a contact of the seal ring member 24 with an end of the biasing member 34 which is wound into a coil.

As shown in FIG. 3(a), the annular outer circumferential portion 44a is formed between the first stopper portions 54a and the second stopper portion 48a. Extending portions 44b are formed so as to extend in the same plane as the annular outer circumferential portion 44a, be recessed relative to the protruding portions 54 and the projecting portions 55, and be adjacent to the protruding portions 54 in a circumferential direction. The extending portions 44b prevent the seal ring member 24 from being caught at edges of the groove portions 52 when the sealing ring member 24 is partially deformed. The extending portions 44b are not adjacent to the projecting portions 55 in the circumferential direction, and hence, the groove portions 52 are formed between the extending portions 44b and the projecting portions 55.

The groove portions 52 are each formed so as to be recessed relative to the annular outer circumferential portion 44a and the extending portions 44b and are also formed so as to be recessed relative to the protruding portions 54 and the projecting portions 55. The groove portions 52 and the extending portions 44b function as a hole portion which is recessed relative to the projecting portions 55 and are provided to allow the first chamber to communicate with the second chamber of the cylinder 30 which are so divided by the seal ring member 24.

The groove portions 52 is adjacent to the projecting portions 55 in the circumferential direction and is adjacent to the protruding portions 54 in the circumferential direction at a side of the first large diameter portion 46. Portions of the protruding portions 54 which is adjacent to the groove portions 52 in the circumferential direction are not closed by the seal ring member 24 to thereby secure a ventilation path between the first chamber and the second chamber in an ensured fashion. Additionally, enlarging the groove portions 52 makes it difficult for the groove portions 52 to be clogged up with a lubricant such as grease as a result of an accumulation of the lubricant. The groove portions 52 are formed so as to extend from the third stopper portion 46a to the annular outer circumferential portion 44a at a position adjacent to the projecting portions 55.

The projecting portions 55 are each formed into the shape of a rib so as to extend in the axial direction while projecting radially from the annular outer circumferential portion 44a and are disposed so as to overlap the protruding portions 54 and the first stopper portions 54a in the circumferential direction while being spaced apart from the protruding portions 54 and the first stopper portions 54a in the circumferential direction. The projecting portions 55 are each formed so as to extend along the axial direction of the piston 22 towards the tip end side of the piston 22. The projecting portions 55 each have an inclined surface which is inclined so as to protrude radially outwards from a side of the second stopper portion 48 towards a side of the third stopper portion 46a. The inclined surfaces of the projecting portions 55 function to move the seal ring member 24 towards the second stopper portion 48a when the seal ring member 24 rides on the projecting portions 55. The inclined surfaces of the projecting portions 55 may be formed individually over the whole of the projecting portions 55 or may be formed partially thereon. However, providing the inclined surfaces from proximal ends 55a of the projecting portions 55 at the side of the second stopper portion 48a can facilitate the return of the seal ring member 24 towards the second stopper portion 48. A circumferential width of each of the projecting portions 55 is set smaller than a smallest circumferential width of the groove portions 52. Making the circumferential width of the projecting portions 55 so smaller can suppress a deformation amount of the seal ring member 24, thereby making it easy for the seal ring member 24 to be deformed.

In a modified example, even though surfaces which are adjacent to the projecting portions 55 in the circumferential direction extend flat along the annular outer circumferential portion 44a with no groove portion 52 formed, a gap is formed between the annular outer circumferential portion 44a and the inner circumference of the seal ring member 24 as a result of the seal ring member 24 riding on the inclined surfaces of the projecting portions 55, and the gap portion so formed can be caused to function as a ventilation path. Additionally, groove portions 52 are provided on a piston 22 so as to correspond to the ventilation path which is provided between the seal ring member 24 and the piston 22 as a result of the seal ring member 24 riding on the inclined surfaces of the projecting portions 55. This increases a cross-sectional area of the ventilation path, whereby it becomes difficult for the ventilation path to be clogged with a lubricant, thereby making it possible to prevent abnormal noise from being generated when air passes through the ventilation path.

As shown in FIG. 3(b), the proximal ends 55a of the projecting portions 55 at the side of the second stopper portion 48a are positioned between the first stopper portions 54a and the second stopper portion 48a in the axial direction and are positioned close to the second stopper portion 48a relative to the first stopper portions 54a. By adopting this configuration, the proximal ends 55a of the projecting portions 55 are formed on the annular outer circumferential portion 44a in a position where the proximal ends 55a can enter an inside of the seal ring member 24. This enables the seal ring member 24 to move easily towards the side of the second stopper portion 48a when the seal ring member 24 is deformed partially.

An axial space between the proximal ends 55a of the projecting portions 55 and the second stopper portion 48a shown in FIG. 3(b) is smaller than a wire diameter (a diameter) of the seal ring member 24 and is set so as to be a half the wire diameter of the seal ring member 24 or greater. This enables the seal ring member 24 to move easily towards the side of the second stopper portion 48a when the seal ring member 24 is deformed partially. Additionally, the axial space between the proximal ends 55a of the projecting portions 55 and the second stopper portion 48a is set substantially at a half the wire diameter of the seal ring member 24, and an axial space between the first stopper portions 54a and the second stopper portion 48a is set at the wire diameter of the seal ring member 24.

As shown in FIG. 4(c), the orifice 58 is formed in the piston 22 so as to allow the first chamber to communicate with the second chamber. The orifice 58 is a very small air hole. A cross-sectional area of the orifice 58 is smaller than a cross-sectional area of a flow path which results when the groove portions 52 establish a communication as a result of the seal ring member 24 being deformed partially.

EMBODIMENTS OF INVENTION

Figure 5:
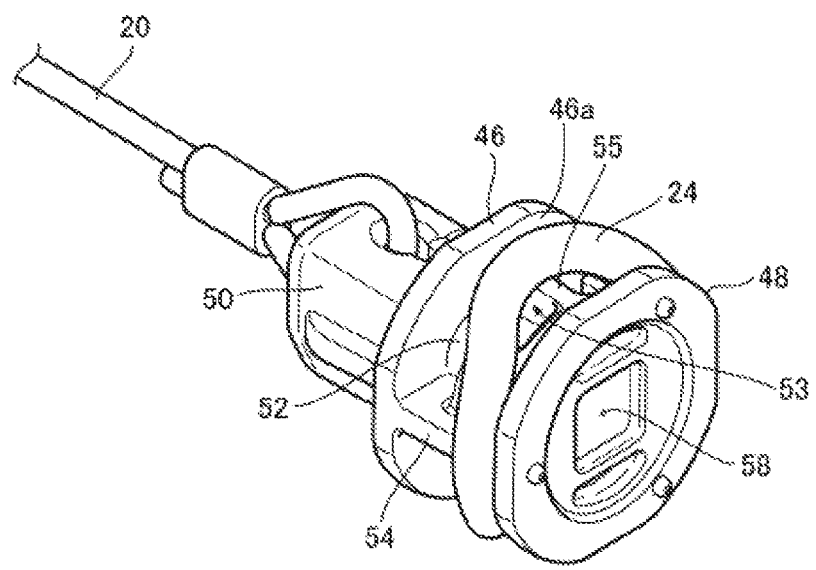
FIG. 5 is a perspective view of the piston for explaining a movement of a seal ring member.

FIG. 5 is a view for use in describing a movement of the seal ring member 24. In FIG. 5 the seal ring member 24 is deformed partially due to a friction between the seal ring member 24 and an inner circumferential surface of the cylinder 30 and a fluid pressure.

Although the seal ring member 24 is restricted from moving towards the tip end side of the piston 22 in the axial direction by the pair of first stopper portions 54a, portions of the seal ring member 24 which are not in abutment with the first stopper portions 54a can move towards the tip end side in the axial direction, and the seal ring member 24 is caused to move partially due to the friction and the fluid pressure.

The piston 22 has a space where to receive the seal ring member 24 at a portion where the first stopper portions 54a are not formed in the circumferential direction between the third stopper portion 46a and the annular outer circumferential portion 44a. In a receiving space 53 where to receive the seal ring member 24, the projecting portions 55 and the groove portions 52 are formed on the piston 22.

A part of the seal ring member 24 enters the receiving space 53 where to receive the seal ring member 24 and rides on the projecting portions 55 to be deformed, whereby the first chamber and the second chamber are allowed to communicate with each other via the hole portions, that is, the groove portions 52. A gap is formed by a part of the inner circumferential surface of the seal ring member 24 and the groove portions 52, whereby the first chamber and the second chamber are allowed to communicate with each other at the receiving space 53, and a fluid inside the cylinder passes therethrough.

The projecting portions 55 function as a guide for returning the seal ring member 24 to its original position as a result of the projecting portions 55 being inclined. When the sealing ring member 24 is caused to deflect greatly by increasing the circumferential width of the projecting portions 55 which partially deform the seal ring member 24, there is a possibility that the partial deformation of the seal ring member 24 is not restored by the restoring force thereof. However, it becomes easy for the seal ring member 24 to be restored to its original shape as a result of the projecting portions 55 being inclined.

Additionally, as a result of the projecting portions 55 being inclined, when the seal ring member 24 rides on the projecting portions 55, a part of the seal ring member 24 is deformed radially outwards so as to increase an opening area at the side of the second chamber, thereby making it possible to increase an amount of passage of the fluid. Although the seal ring member 24 is collapsed into the gap defined between the projecting portions 55 and the inner circumference of the cylinder 30 when the seal ring member 24 is partially deformed, since the seal ring member 24 is deformed only partially, stress exerted on the seal ring member 24 can be released.

An inclination angle of the projecting portions 55 may be set at an angle of 2 degrees or more to 10 degrees or less so as not to interrupt greatly the partial deformation of the seal ring member 24.

FIG. 6(a) to 6(c) show views of the damper device 10 for explaining an operation thereof. FIG. 6(a) shows a normal state of the damper device 10, FIG. 6(b) shows a state in which the piston 22 is returning to its normal position by the action of the biasing member 34, and FIG. 6(c) shows a state in which the piston 22 has just returned to its normal position.

When the openable/closable member is being opened, that is, when the transmitting member 20 is pulled to contract the biasing member 34, the damper device 10 generates a relatively great damping force so that the openable/closable member can be opened slowly. When the openable/closable member is closed, the damper device 10 generates a relatively small damping force so that the openable/closable member can be closed smoothly, or the openable/closable member can be closed smoothly due to the biasing force of the biasing member 34.

As shown in FIG. 6(a), when the damper device 10 is not in operation, the seal ring member 24 remains uniform in configuration in the circumferential direction, with its inner circumferential surface kept in abutment with the annular outer circumferential portion 44a. In this state, even in case the transmitting member 20 is pulled, the seal ring member 24 remains uniform in configuration in the circumferential direction although the seal ring member 24 is pushed towards the side of the second stopper portion 48a, and hence, the seal ring member 24 is not partially deformed. The seal ring member 24 is pushed in an opposite direction to a traveling direction of the piston 22 due to a friction generated between the cylinder 30 and itself.

The seal ring member 24 closes or cuts off a communication between the first chamber 62 and the second chamber 62 which is established by way of the groove portions 52 when the seal ring member 24 is pushed towards the side of the second stopper portion 48a. Alternatively, when the seal ring member 24 is pushed towards the side of the second stopper portion 48a, the seal ring member 24 may be configured such that an area of an opening in the groove portions 52 through which the first communication chamber 62 communicates with the second chamber 64 when the seal ring member 24 is pushed towards the side of the second stopper portion 48a is reduced as compared with the area of the opening in the groove portions 52 when the seal ring member 24 is pushed towards the first stopper portions 54a. By adopting this configuration, in an open state, the second chamber 64 constitutes a source of a negative pressure, thereby making it possible to generate a great resistance.

As shown in FIG. 6(b), in such a state that the piston 22 is returning to its normal position, the seal ring member 24 is pushed to the side of the first stopper portions 54a and the third stopper portion 46a due to the friction generated between the inner circumferential surface of the cylinder 30 and the seal ring member 24 and a fluid pressure from the second chamber 64, and the portions of the seal ring member 24 which are not restricted by the first stopper portions 54a are deformed so as to be bent.

Then, a part of the seal ring member 24 rides on halfway portions of the projecting portions 55 and the groove portions 52 in the axial direction, whereby the seal ring member 24 leaves both axial ends of the groove portions 52 uncovered, so that the first chamber 62 and the second chamber 64 of the cylinder 30 are allowed to communicate with each other. The area of the opening in the groove portions 52 through which the first chamber 62 communicates with the second chamber 64 when the seal ring member 24 is pushed towards the side of the first stopper portions 54a is increased as compared with the area of the opening in the groove portions 52 when the seal ring member 24 is pushed towards the side of the second stopper portion 48a.

When the piston 22 is returning to its normal position, the seal ring member 24 is pushed towards the side of the third stopper 46a and is partially deformed to enter a space defined between the annular outer circumferential portion 44a and the third stopper 46a. This opens axial end portions of the groove portions 52 at the side of the first chamber 62 in the axial direction to the first chamber 62 and axial end portions of the groove portions 52 close to the second chamber 64 to the second chamber 64. Consequently, the groove portions 52 allows the first chamber 62 to communicate with the second chamber 64, whereby air inside the second chamber 64 is caused to move into the first chamber 62 to suppress an increase in positive pressure within the second chamber 64, facilitating the movement of the piston 22. Additionally, the seal ring member 24 can be prevented from falling into the groove portions 52 by the projecting portions 55.

As shown in FIG. 6(c), the seal ring member 24 is still kept partially deformed immediately after the piston 22 has returned to its normal position. The part of the seal ring member 24 which rides on the projecting portions 55 is guided towards the side of the second stopper portion 48a by the inclined surfaces of the projecting portions 55 and is returned to its normal position due to the restoring force thereof.

In this way, the seal ring member 24 is pushed towards the side of the first stopper portions 54a or the side of the second stopper portion 48a as the piston 22 reciprocates, and the seal ring member 24 is deformed partially when it is pushed towards the side of the first stopper portions 54a. Then, the part of the seal ring member 24 is deformed partially as the piston 22 reciprocates so as to cut off the communication between the first chamber 62 and the second chamber 64 which is established by the groove portions 52. The area of the opening in the groove portions 52 through which the first chamber 62 communicates with the second chamber 64 may be increased or decreased by the deformation of the seal ring member 24, and in the normal state, the communication opening of the groove portions 52 to the second chamber 64 may not be closed completely.

By adopting this configuration, an amount of exposure of the groove portions 52 into the second chamber 64 is increased when the seal ring member 24 rides on the projecting portions 55, thereby making it possible to increase the area of the communication opening through which the first chamber 62 communicates with the second chamber 64. In case the area of the communication opening between the first chamber 62 and the second chamber 64 is increased, since air is made easy to move inside the cylinder 30, a damping force generated in the damper device 10 becomes small. Additionally, the area of the communication opening of the groove portions 52 can be increased or decreased as the piston 22 reciprocates. When the piston 22 advances, the seal ring member 24 is not deformed, and the groove portions 52 are exposed less, whereby a great damping force is generated in the damper device 10. On the other hand, when the piston 22 recedes, the seal ring member 24 is deformed partially, and the amount of exposure of the groove portions 52 to the second chamber 64 is increased, whereby a small damping force can be generated in the damper device 10.

For example, in case a great gap is defined between the seal ring member 24 and the second stopper portion 48a in the normal state, volumes of the first chamber 62 and the second chamber 64 hardly changes until the seal ring member 24 is brought into abutment with the second stopper portion 48a to start moving when the piston 22 initially advances, and therefore, a small resistance is generated in the damper device 10. In the damper device 10 of this embodiment, the seal ring member 24 can be restored from the deformed state to its original state by the inclined surface of the projecting portions 55, whereby a damping force can initially be generated with good efficiency for the next operation. Additionally, the seal ring member 24 can be prevented from falling into the groove portions 52 by the projecting portions 55, thereby making it possible to allow the seal ring member 24 to be deformed partially in a smooth fashion.

As shown in FIG. 6(a), with the damper device 10 staying the normal inoperative state, the seal ring member 24 is provided on the annular outer circumferential portion 44a while being in abutment with both the first stopper portions 54a and the second stopper portion 48a. This prevents the seal ring member 24 and the piston 22 from moving relatively to each other, thereby making it possible to enhance the response of the damper device 10 when it is initially actuated to operate. A space between the first stopper portions 54a and the second stopper portion 48 is set according to the wire diameter of the seal ring member 24 so that both the first stopper portions 54a and the second stopper portion 48a can be brought into abutment with the seal ring member 24.

Figure 7A:
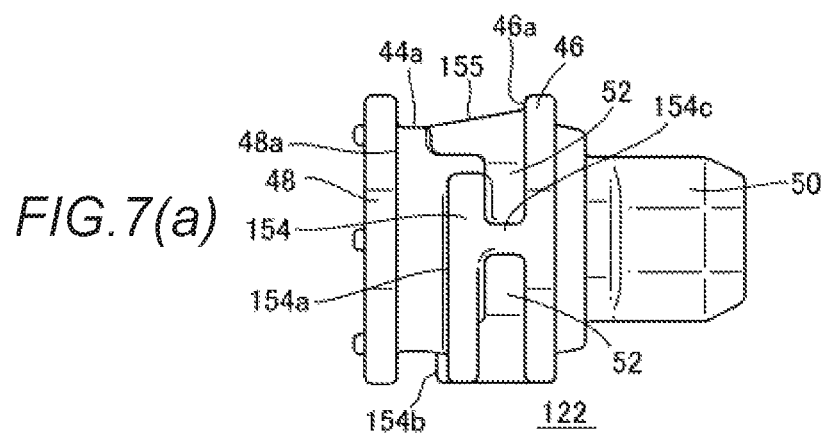
FIG. 7(a) to 7(c) shows views of a piston according to a modified example for explaining the piston.
Figure 7B:
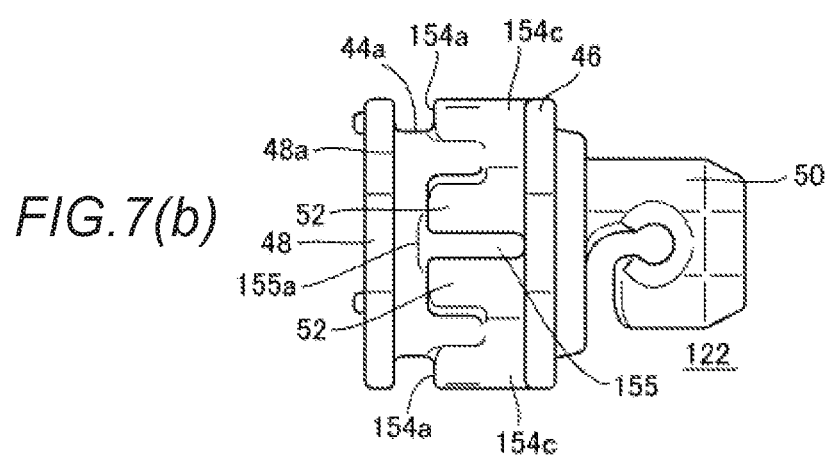
Figure 7C:
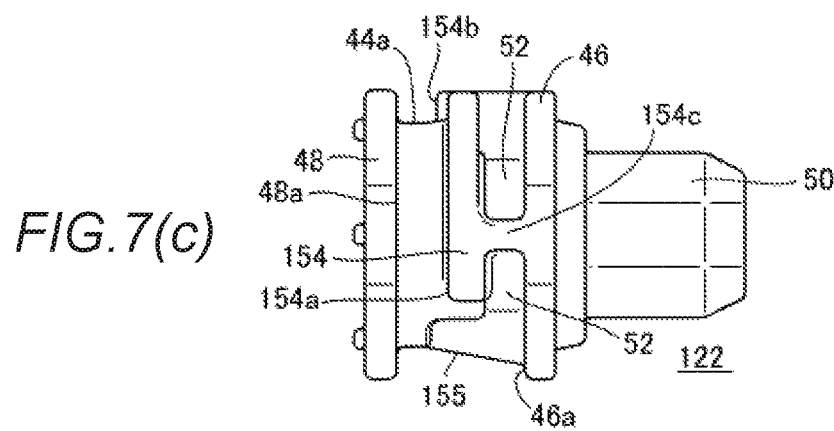

FIG. 7(a) to 7(c) show views of a piston 122 according to a modified example for explaining the piston. Additionally, FIG. 8 is a view of the piston 122 according to the modified example for explaining an operation of a seal ring member 24 of the piston 122.

Figure 8:
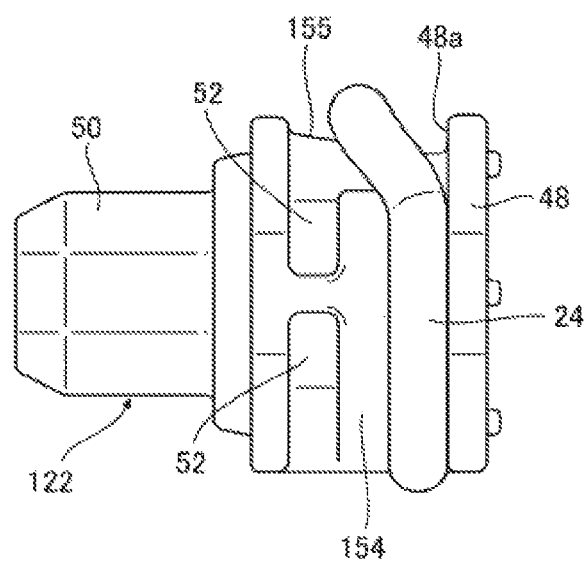
FIG. 8 shows a view of the piston according to the modified example for explaining a seal ring member thereof.

In the piston 122 according to the modified example shown in FIG. 7(a), compared with the piston 22 shown in FIG. 3(a), there is provided one inclined projecting portion 155, and a protruding portion 154 is formed wider in a circumferential direction, whereby a space is formed narrower where the seal ring member 24 can be deformed partially as shown in FIG. 8. By adopting this configuration, in the piston 122 according to the modified example, compared with the piston 22 shown in FIG. 3(a), an amount of change in damping force as a result of a partial deformation of the seal ring member 24 can be decreased.

Only the single inclined projecting portion 155 is provided on the piston 122 shown in FIG. 7(a) which results when seen from a front side a connecting portion 50 and on the piston 122 shown in FIG. 7(b) which results when seen from a rear side of the connecting portion 50. As shown in FIG. 7(b), groove portions 52 are formed so as to be adjacent to the projecting portion 155 in a circumferential direction.

The projecting portion 155 is formed into the shape of a rib which extends in an axial direction while projecting radially outwards beyond an annular outer circumferential portion 44a and is disposed so as to overlap the protruding portion 154 and a first stopper portion 154a in a circumferential direction. The projecting portion 155 has an inclined surface which is inclined so as to protrude radially outwards from a side of a second stopper portion 48a towards a side of a third stopper portion 46a. The protruding portion 154 is connected to a first large diameter portion 46 by a rib-shaped connecting portion 154c.

As the piston 122 includes the one projection portion 155, the protruding portion 154 of the piston 122 is formed larger in the circumferential direction than that of the piston 22 shown in FIG. 3(a), and its angular width is set at, for example, an angle ranging from 180 degrees to 300 degrees. Namely, the protruding portion 154 is formed so as to extend a half or greater a full circumference in the circumferential direction, and the first stopper portion 154a is also formed so as to extends a half or greater the full circumference. The first stopper portion 154a has a projecting abutment portion 154b in a halfway position in the circumferential direction. The abutment portion 154b projects towards the second stopper portion 48a. In a normal state, the abutment portion 154b is in abutment with the seal ring member 24 to restrict an axial movement of the seal ring member 24 so as to generate a damping force with good efficiency from an initial operation of the piston 122.

An axial space between the abutment portion 154b and the second stopper portion 48a is set equal to or smaller than a wire diameter of the seal ring member 24, and an axial space between the portion of the first stopper portion 154a other than the abutment portion 154b and the second stopper portion 48a may be set greater than the wire diameter of the seal ring member 24. By adopting this configuration, the first stopper portion 154a can be provided so that the portion of the first stopper portion 154a other than the abutment portion 154b permits a partial deformation of the seal ring member 24 while restricting an axial movement of the whole of the seal ring member 24 by the abutment portion 154b.

The invention is not limited to the embodiments that have been described heretofore, and hence, various types of modifications including design changes can be made to the embodiments based on the knowledge of those skilled in the art to which the invention pertains, and the resulting embodiments to which such modifications are made are also included in the scope of the invention.

In the embodiment, the pair of stopper portions 54a are provided, and the pair of projecting portions 55 are provided. However, the invention is not limited to the above aspect, and hence, three or more first stopper portions 54a and projecting portions 55 may be provided.

In the embodiment, the piston 22 is biased by the biasing member 34. However, the invention is not limited to the above aspect, and hence, the biasing member 34 may be omitted. In the embodiment, the piston 22 is separated from the transmitting member 20. However, the invention is not limited to the above aspect, and hence, the piston 22 may be integrated with the transmitting member 20.

In the embodiment, the seal ring member 24 can be deformed partially towards the side of the first chamber 62. However, the invention is not limited to the above aspect. For example, the connecting portion 50 is provided on the second large diameter portion 48, and the transmitting member 20 is connected to the connecting portion 50 so provided so that a relatively small damping force can be generated when the piston 22 is pulled, while a relative great damping force can be generated when the piston 11 is pushed in.

In the embodiment, the groove portions 52 are formed in the piston 22 as the configuration for allowing the first chamber 62 to communicate with the second chamber 64. However, the invention is not limited to the above aspect. For example, a communication hole for allowing the first chamber 62 to communicate with the second chamber 64 may be provided in the piston 22. One opening of the communication hole is opened to the first chamber 62, and the other opening of the communication hole is provided on the annular outer circumferential portion 44a. In the normal state, although the one opening of the communication hole is opened, the other opening of the communication hole which is positioned on an outer circumference of the annular outer circumferential portion 44a is closed by the seal ring member 24, whereby the communication between the first chamber 62 and the second chamber 64 is cut off. When the seal ring member 24 rides on the projecting portions 55, the other opening of the communication hole is opened, whereby a communication between the first chamber 62 and the second chamber 64 is established. The other opening of the communication hole is provided on the annular outer circumferential portion 44a positioned at the side of the second chamber 64 relative to the projecting portions 55. In this aspect, a part of the seal ring member 24 rides on and down from the projecting portions 55 as the piston 22 reciprocates, so that the communication between the first chamber 62 and the second chamber 64 can be established or cut off via the hole portion which is the communication hole. In this aspect, the seal ring member 24 can be restored from the deformed state to the original state due to the restoring force thereof, whereby a damping force can be exhibited with good efficiency for the next operation from a point in time when the damper device 10 is actuated initially to operate.

BRIEF DESCRIPTION OF REFERENCE NUMERALS

10 Damper device; 20 Transmitting member; 20a First connecting portion; 20b Second connecting portion; 22 Piston; 24 Seal ring member; 30 Cylinder; 32 Lid member; 34 Biasing member; 36 Cylindrical portion; 38 Attaching portion; 42 Bottom portion; 44 Small diameter portion; 44a Annular outer circumferential portion; 44b Extending portion; 46 First large diameter portion; 46a Third stopper portion; 48 Second large diameter portion; 48a Second stopper portion; 50 Connecting portion; 52 Groove portion; 53 Receiving space; 54 Protruding portion; 54a First stopper portion; 55 Projecting portion; 55a Proximal end; 56 Pedestal portion; 58 Orifice; 62 First chamber; 64 Second chamber

INDUSTRIAL APPLICABILITY

The present invention relates to the damper device in which the seal ring member is provided on the outer circumference of the piston which is disposed within the cylinder.

The invention claimed is:
1. A damper device comprising:
a cylinder having a bottom portion and an opening portion;
a piston being reciprocatable within the cylinder;
a seal ring member provided on an outer circumference of the piston to divide an interior of the cylinder into a first chamber and a second chamber and brought into abutment with an inner circumference of the cylinder; and
a transmitting portion connected to the piston so as to transmit an external force to the piston,
wherein the piston comprises:
an annular outer circumferential portion which is brought into abutment with an inner circumference of the seal ring member;
a first stopper portion which is provided so as to project in a radial direction from the annular outer circumferential portion at a side of the first chamber to restrict an axial movement of a part of the seal ring member;
a second stopper portion which is provided so as to project in the radial direction from the annular outer circumferential portion at a side of the second chamber to restrict an axial movement of the seal ring member; and
a projecting portion which is formed so as to extend in an axial direction while projecting in the radial direction beyond the annular outer circumferential portion and which is disposed so as to be spaced apart from the first stopper portion in a circumferential direction,
wherein the projection portion has an inclined surface which is inclined radially outwards from a side of the second stopper portion towards a side of the first stopper portion, and
wherein the seal ring member is configured to allow the first chamber to communicate with the second chamber when a portion of the seal ring member which is not restricted by the first stopper portion is deformed in a direction away from the second stopper portion due to friction caused between the seal ring member and the cylinder or a fluid pressure from the second chamber to ride on the inclined surface.

2. The damper device according to claim 1, wherein a proximal end of the projecting portion at a side of the second stopper portion is positioned between the first stopper portion and the second stopper portion in the axial direction.

3. The damper device according to claim 2, wherein a space between the proximal end of the projecting portion at the side of the second stopper portion and the second stopper portion in the axial direction is smaller than a wire diameter of the seal ring member.

4. The damper device according to claim 1, further comprising a third stopper portion which projects radially outwards from a tip end side of the projecting portion at a position away from the second stopper portion relative to the first stopper portion in the axial direction.

* * * * *